(12) United States Patent
Figueroa

(10) Patent No.: US 11,221,487 B2
(45) Date of Patent: Jan. 11, 2022

(54) METHOD AND DEVICE OF FIELD SEQUENTIAL IMAGING FOR LARGE FIELD OF VIEW AUGMENTED/VIRTUAL REALITY

(71) Applicant: Kevin Chew Figueroa, Pasadena, CA (US)

(72) Inventor: Kevin Chew Figueroa, Pasadena, CA (US)

( * ) Notice: Subject to any disclaimer, the term of this patent is extended or adjusted under 35 U.S.C. 154(b) by 0 days.

(21) Appl. No.: 16/831,778

(22) Filed: Mar. 26, 2020

(65) Prior Publication Data

US 2020/0310134 A1    Oct. 1, 2020

Related U.S. Application Data

(60) Provisional application No. 62/824,298, filed on Mar. 26, 2019.

(51) Int. Cl.
*G02B 27/01* (2006.01)
*G06T 11/60* (2006.01)
*G06F 3/01* (2006.01)
*G02B 6/32* (2006.01)
*G06T 19/00* (2011.01)

(52) U.S. Cl.
CPC .......... *G02B 27/0172* (2013.01); *G02B 6/32* (2013.01); *G06F 3/013* (2013.01); *G06T 11/60* (2013.01); *G06T 19/006* (2013.01); *G02B 2027/014* (2013.01); *G02B 2027/0118* (2013.01); *G02B 2027/0123* (2013.01); *G06T 2200/24* (2013.01); *G06T 2210/62* (2013.01)

(58) Field of Classification Search
CPC ........ G02B 27/0172; G02B 2027/0118; G02B 2027/0123; G02B 2027/014; G02B 6/32; G06F 3/013; G06T 11/60; G06T 2200/24; G06T 2210/62

USPC ......................................................... 345/633
See application file for complete search history.

(56) References Cited

U.S. PATENT DOCUMENTS 7,817,104 B2    10/2010    Ryu et al.
9,063,330 B2     6/2015    LaValle et al.
(Continued)

OTHER PUBLICATIONS

Yuan, J., et al. "The Visual Effects Associated with Head-Mounted Displays." Int J Ophthalmol Clin Res 5 (2018): 085.
(Continued)

*Primary Examiner* — Abdul-Samad A Adediran
(74) *Attorney, Agent, or Firm* — Narek Zohrabyan; Phil IP Law Inc.

(57) ABSTRACT

The variable depth of field sequential imaging method and system achieves the science fiction idea of AR as a compact, near to the eye, transparent screen. It comes together by merging the two concepts of variable depth of field and field sequential imaging into variable depth of field sequential imaging. The method and system places the transparent imaging screen in front and along the eye's optical axis and directly along the line of sight. The method and system may make AR and VR similar as far as VR's field of view ability, may generate opaque AR objects, and function as a single headset. Additionally, it will accommodate to user's prescription eyewear removing the need to wear additional corrective lenses with the headset, as well as it may track eye movement to properly render computer-generated objects at a focusable distance for the user's eye.

17 Claims, 14 Drawing Sheets

(56) References Cited

U.S. PATENT DOCUMENTS

| | | | |
|---|---|---|---|
| 9,720,505 B2 | 8/2017 | Gribetz et al. | |
| 2014/0184496 A1 | 7/2014 | Gribetz et al. | |
| 2015/0241698 A1* | 8/2015 | Schowengerdt | G02B 6/32 345/633 |
| 2018/0276894 A1 | 9/2018 | Chang et al. | |
| 2019/0025587 A1 | 1/2019 | Osterhout et al. | |

OTHER PUBLICATIONS

Akşit, Kaan, et al. "Near-eye varifocal augmented reality display using see-through screens." ACM Transactions on Graphics (TOG) 36.6 (2017): 1-13.

Cakmakci, Ozan, and Jannick Rolland "Head-worn displays: a review" Journal of display technology 2.3 (2006): 199-216.

Fokus tunable lenses, presented by Mark Blum of Optotune, URL [https://www.youtube.com/watch?v=0HxpnP8b2qU&feature=youtu.be] last visited on Mar. 23, 2020.

Focus stacking in real time, URL [https://www.youtube.com/watch?v-NBXIMhBIUQ], last visited on Mar. 23, 2020.

Moon, Seokil, et al. "Augmented reality near-eye display using Pancharatnam-Berry phase lenses." Scientific reports 9.1 (2019): 1-10.

Kiyokawa, Kiyoshi, et al. "An occlusion capable optical see-through head mount display for supporting co-located collaboration." The Second IEEE and ACM International Symposium on Mixed and Augmented Reality, 2003. Proceedings. IEEE, 2003.

El Jamiy, Fatima, and Ronald Marsh. "Survey on depth perception in head mounted displays: distance estimation in virtual reality, augmented reality, and mixed reality" IET Image Processing 13.5 (2019): 707-712.

Kress, Bernard, and Thad Starner. "A review of head-mounted displays (HMD) technologies and applications for consumer electronics." Photonic Applications for Aerospace, Commercial, and Harsh Environments IV. vol. 8720. International Society for Optics and Photonics, 2013.

Sutherland, Ivan E. "A head-mounted three dimensional display." Proceedings of the Dec. 9-11, 1968, fall joint computer conference, part I. 1968.

\* cited by examiner

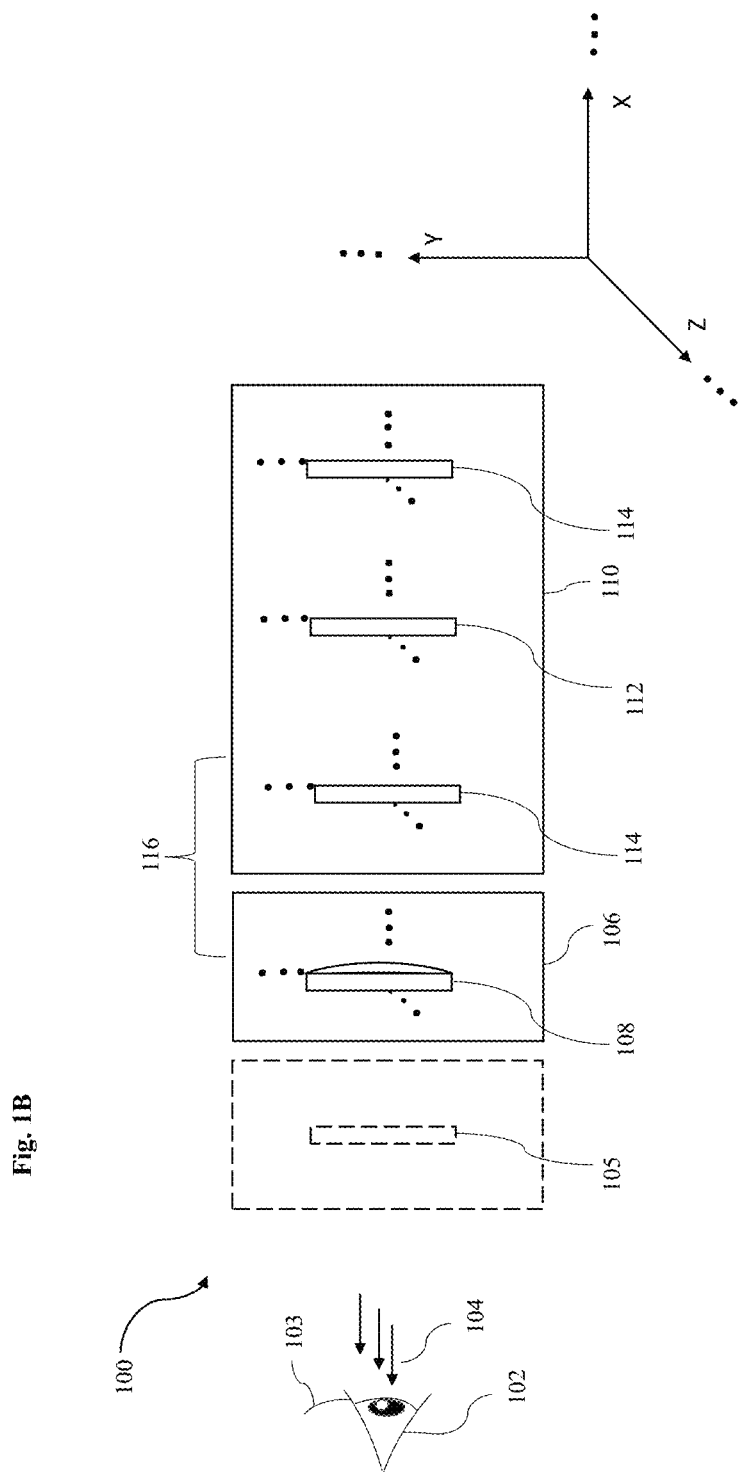

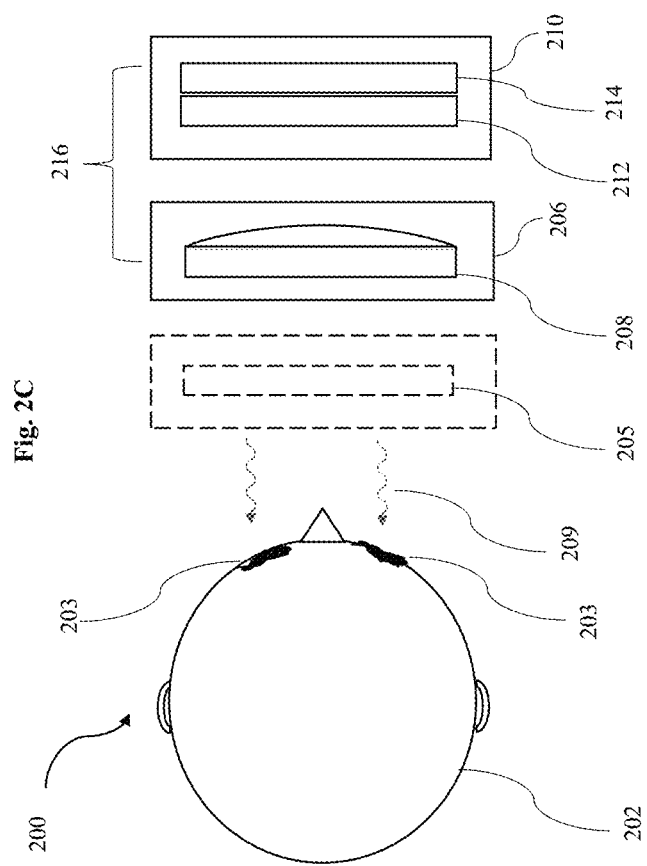

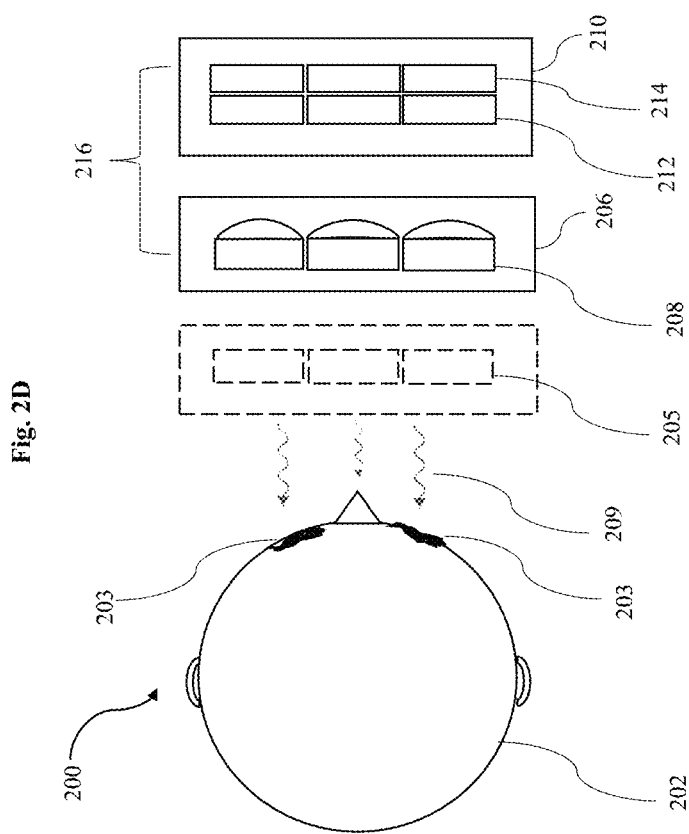

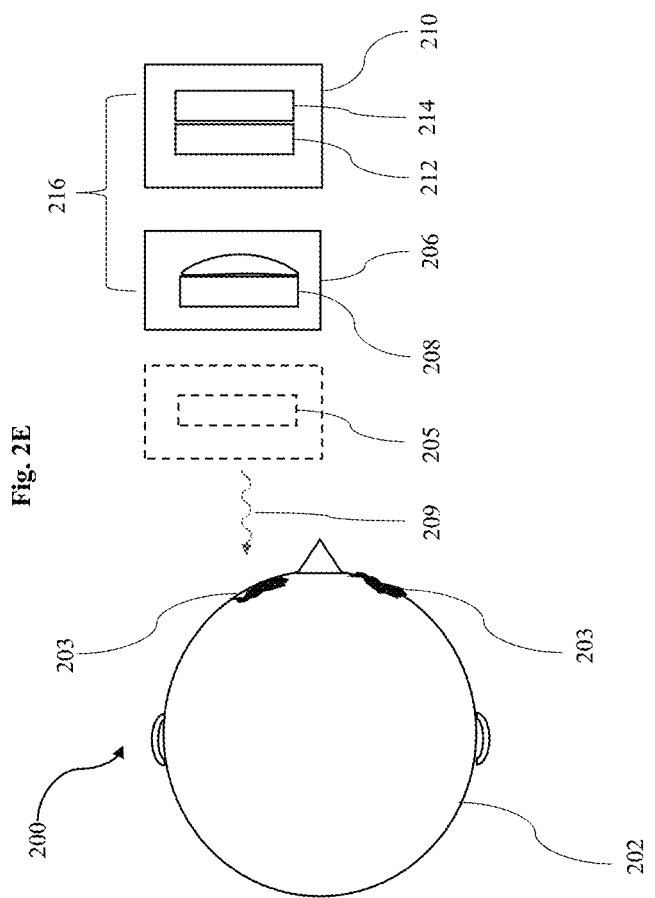

METHOD AND DEVICE OF FIELD SEQUENTIAL IMAGING FOR LARGE FIELD OF VIEW AUGMENTED/VIRTUAL REALITY

PRIORITY CLAIMS AND CROSS-REFERENCE TO RELATED APPLICATIONS

This application is related to and claims domestic priority benefits under 35 USC § 119(e) from U.S. Provisional Patent Application Ser. No. 62/824,298 filed on Mar. 26, 2019, the entire contents, of the aforementioned application, are expressly incorporated hereinto by reference.

BACKGROUND

The invention relates to Augmented Reality (AR) and Virtual Reality (VR) technology that uses transparent visual displays(s) along with visual element(s).

The advent of AR and VR technologies has been useful in many fields and in applications, such as: factory automation, computer supported collaborative work, telemedicine, field guide in urban conditions, remote collaboration, computer games and entertainment, archeological inquiries and surveying, military and space exploration settings, etc.

Some forms of AR immersive technology implemented through a Head Mounted Display (HMD) device have certain limitations that makes it less practical. Furthermore, hybrid AR and VR systems also contain certain problems prevalent in the sphere.

For example, a video pass through AR based system presents a masked image upon a user's hand-held device, such as a phone or tablet or even on an HMD device. The masked image is usually a computer-generated image that is overlaid on the scene, captured by the device's camera. Readily, the overlaying of the generated image unto a real-life scene is imperfect and the user discerns the capacity by which this image is "artificial" in nature. To overcome this issue, another system may be implemented that has an optical pass-through configuration which allows the user to view the environment at all times where the computer-generated image will be projected unto. This is achieved, for example by using a HMD device. Where the image generating electronics are placed above, below, or to the sides of the eyes. An exemplary design is to place the image generating and system electronics on the forehead. The image is then projected down towards a semi-reflecting mirror, a half-reflecting glass sheet or using a beam splitter configuration. These components may be aligned to the optical axis of the eyes but at a 45° orientation. The computer-generated image is then projected on the mirror/glass sheet/or beam splitter such that the eye sees both the generated image and the real-life scenery around the generated image. However, the computer-generated image does a poor job of overlaying the real-life scenery and the containing objects as intended. This results into a "ghosting" effect where the real-life scenery is visible through the computer-generated image, making the image appear transparent or ghost-like. The "ghosting" effect is even more pronounced when the real-life scenery is bright which overexposes the masking computer-generated image, making it so transparent it becomes nearly impossible for the eyes to discern.

Additionally, projecting images unto a semitransparent plane at a 45° orientation, or even directly projecting images from a transparent imaging element placed on the optical axis, in an HMD based device has inherent limitations such that the semitransparent plane has to be at a certain distance from the eye. If the semitransparent plane is too close, the eye cannot focus on the image and the user will not be able to comprehend the contents in the image. This is synonymous with holding a book against a person's face, and still expecting for the eyes to properly focus on the overly close text. Moving the semitransparent plane to a minimum focusable distance still results in and does not change the eye's limited depth of field. This limited depth of field results in the user's eyes having to alternate focusing between the blurred real-life scenery and focusing on the projected image, or, seeing a real-life scenery and seeing a blurred projected image. As a result, such systems lower the quality of the visual immersive experience, as the computer-generated image should appear as though it is a distance away, but is really focused too close or in the other case, can be focused too far away when the computer-generated image should appear close.

To attempt remedying the issue, optical pass-through systems use a method to focus the computer-generated image to a proper focus distance prior to projecting it on the semitransparent plane. However, this technique is limited to systems projecting unto a 45° oriented transparent plane. Systems that directly project images from a transparent image element perpendicular to the optical axis are not usually implemented. As implementing the pre-focusing technique would require placing the focusing element directly between the eye and the transparent imaging element. While this would properly focus the computer-generated image, this would improperly focus the real-life scenery whose light would pass through the transparent screen and then through the focus element. This is synonymous to holding a magnifying glass to one's eye and expecting to comprehend the real-life world around him/her.

Furthermore, some AR systems have other design limitations. One such limitation is the inability to provide the user with a desirable Field of View (FoV) for a full immersive experience. Due to the fundamental configurations of video pass-through and optical pass-through (45° plane) AR based systems, they only provide a limited FoV range of between 40°-60° with some segmented AR systems ranging between 100°-150°. However, an exemplary AR based HMD device is still limited to about a 60° range, which is much smaller than what the Human Visual System (HVS) can account for. The HVS can account to about 200° FoV on the horizontal plane and 130° FoV on the vertical plane. In this regard, VR systems do a better job of providing a higher FoV for the user, typically in the range of between 90° to 120°.

Note, that because some users need to wear corrective lens eyewear, some AR devices must be placed further back, from the eye, in order to allow room for the user's eyewear, and thereby increasing the eye relief. The tradeoff here is that by moving the imaging system further away, it further decreases the perceived FoV of the system.

Introducing VR based HMD devices are sometimes substituted in immersive based application although that has its limitations as well. For example, the resolution of the images are constrained and additional focus elements are needed to project the virtual image at a proper distance to account for the Vergence-Accommodation Conflict (VAC).

SUMMARY

In accordance with an aspect, there is provided a system, including:
at least one transparent image display element placed along the optical axis of a user's eye; at least one variable focus element placed along the optical axis of a user's eye, and situated between the at least one transparent image display and the user's eye(s); at least one light valve element placed along the optical axis of the user's eye preceded by the at least one transparent image display element which is further preceded by the at least one variable focus element which is further preceded by the user's eye; one or more processors; a controller communicatively coupled to the one or more processors; a memory communicatively coupled to the controller and to the one or more processors; and one or more set of instructions, wherein the one or more set of instructions are stored in the memory and configured to be executed by the one or more processors, and in concert with the controller, wherein the one or more set of instructions include executable instructions to: generate a computer-generated information on the at least one transparent image display element; control pass-through of real-world scenery through the at least one light valve element; and change the focal power of the at least one variable focus element faster than the user's eye can perceive.

In accordance with an aspect, there is provided a system, including: the variable depth of field sequential imaging system, wherein the at least one transparent image display, the at least one variable focus element, and the at least one light valve element can be scaled up to include multiples of the set of at least one transparent image display, the at least one variable focus element and the least one light valve element such that the multiples of the set function independently of another, asynchronously with one another, dependently from one another, or in-sync with one another, or in any combination.

In accordance with an aspect, there is provided a system, including: the variable depth of field sequential imaging system, wherein the system further includes an input module communicatively coupled to the processor that has one or more set of instructions including executable instructions to allow the user to input the user's eye prescription, select an operational mode, set opacity, or set a duty cycle.

In accordance with an aspect, there is provided a system, including: the variable depth of field sequential imaging system, wherein the system further includes: an eye-gaze tracker; and the eye-gaze tracker can be enabled by the user with the input module.

In accordance with an aspect, there is provided a system, including: the variable depth of field sequential imaging system, wherein the system is implemented on a head-mounted device.

In accordance with an aspect, there is provided a system, including: the variable depth of field sequential imaging system, wherein the system is implemented on a visual device.

In accordance with an aspect, there is provided a method, including: a method of implementing the variable depth of field sequential imaging, the method comprising: controlling at least one transparent image display element to show a computer-generated object and displaying the surrounding region as black; controlling at least one light valve element to block light emanating from a real-life scenery; controlling at least one variable focus element to adjust its focal power such that the computer-generated object is in focusable distance for a user's eye; controlling at least one transparent image display element to show a negated artifact, of desired intensity, of the computer-generated object and placing the negated artifact in a position relative to the corresponding position of the computer-generated object; controlling at least one light valve element to allow light emanating from the real-life scenery; and controlling at least one variable focus element to adjust its focal power such that the real-life scenery is in focus for the user's eye.

In accordance with an aspect, there is provided a method, including: controlling of the at least some of the sets of the transparent image display element, the light valve element and the variable focus element are either independent, dependent, asynchronous, or in-sync, or in any combination.

In accordance with an aspect, there is provided a method, including: receiving a user input for an opacity value that directly impacts the intensity of the negated artifact; and receiving a user input for a duty cycle that directly impacts the percentage of the period that the at least one transparent image display element, the at least one light valve element, and the at least one variable focus element operates per cycle.

In accordance with an aspect, there is provided a method, including:

receiving a user input for an opacity value that directly impacts the intensity of the negated artifact; and receiving a user input for a duty cycle that directly impacts the percentage of the period that the at least one transparent image display element, the at least one light valve element, and the at least one variable focus element operates per cycle.

In accordance with an aspect, there is provided a method, including: receiving a user input that sets an operational mode for the method between a virtual reality mode, a passive mode or a mixed mode; receiving a user input that sets the user's eye prescription; and controlling at least one variable focus element to adjust the optical output of any of the operational modes whereby corrective lenses are unnecessary and eye-relief is minimized for the viewing experience.

In accordance with an aspect, there is provided a method, including: wherein the passive mode is operated by: controlling at least one of the transparent image display elements to not display any computer-generated objects; and controlling at least one of the light valve elements to allow light emanating from the real-life scenery.

In accordance with an aspect, there is provided a method, including: wherein the virtual reality mode is operated by: controlling at least one of the light valve elements to block light emanating from the real-life scenery; controlling at least one of the transparent image display elements to display the computer-generated object; and controlling at least one variable focus element to adjust its focal power such that the computer-generated object is in focusable distance for the user's eye.

In accordance with an aspect, there is provided a method, including: wherein the mixed mode is operated by: controlling at least one transparent image display element to show a computer-generated object and displaying the surrounding region as black; controlling at least one light valve element to block light emanating from a real-life scenery; controlling at least one variable focus element to adjust its focal power such that the computer-generated object is in focusable distance for a user's eye; controlling at least one transparent image display element to show a negated artifact, of desired intensity, of the computer-generated object and placing the negated artifact in a position relative to the corresponding position of the computer-generated object; controlling at least one light valve element to allow light emanating from the real-life scenery; and controlling at least one variable focus element to adjust its focal power such that the real-life scenery is in focus for the user's eye.

In accordance with an aspect, there is provided a method, including: controlling of the at least some of the sets of the transparent image display element, the light valve element and the variable focus element are either independent, dependent, asynchronous, or in-sync, or in any combination.

In accordance with an aspect, there is provided a method, including: receiving a user input for an opacity value that directly impacts the intensity of the negated artifact; and receiving a user input for a duty cycle that directly impacts the percentage of the period that the at least one transparent image display element, the at least one light valve element, and the at least one variable focus element operates per cycle.

In accordance with an aspect, there is provided a method, including: receiving a user input for an opacity value that directly impacts the intensity of the negated artifact; and receiving a user input for a duty cycle that directly impacts the percentage of the period that the at least one transparent image display element, the at least one light valve element, and the at least one variable focus element operates per cycle.

DESCRIPTION OF THE DRAWINGS

Embodiments in accordance with the present invention are shown in the drawings and will be described below with reference to the figures, whereby elements having the same effect have been provided with the same reference numerals. The following is shown:

FIG. 1B shows a schematic view of the large FoV AR/VR (variable depth of field sequential imaging for large field of view augmented/virtual reality) system described herein in another embodiment;

FIG. 2C shows a top down view of an embodiment of the large FoV AR/VR system implemented on a HMD device as described herein;

FIG. 2D shows a top down view of an embodiment of the large FoV AR/VR system implemented on a HMD device as described herein;

FIG. 2E shows a top down view of an embodiment of the large FoV AR/VR system implemented on a HMD device as described herein;

DESCRIPTION

The present system is composed of Transparent Imaging Light Valve Element(s), Variable Focusing Element(s), and optional Eye Tracking Element(s), where some or all of the sections may be implemented, rearranged, repeated in a segmented basis as explained in some embodiments. The combination of the Transparent Imaging Light Valve Element(s) and the Variable Focusing Element(s) is known as the Variable Depth of Field Sequential Imaging Architecture.

Figure 1A:
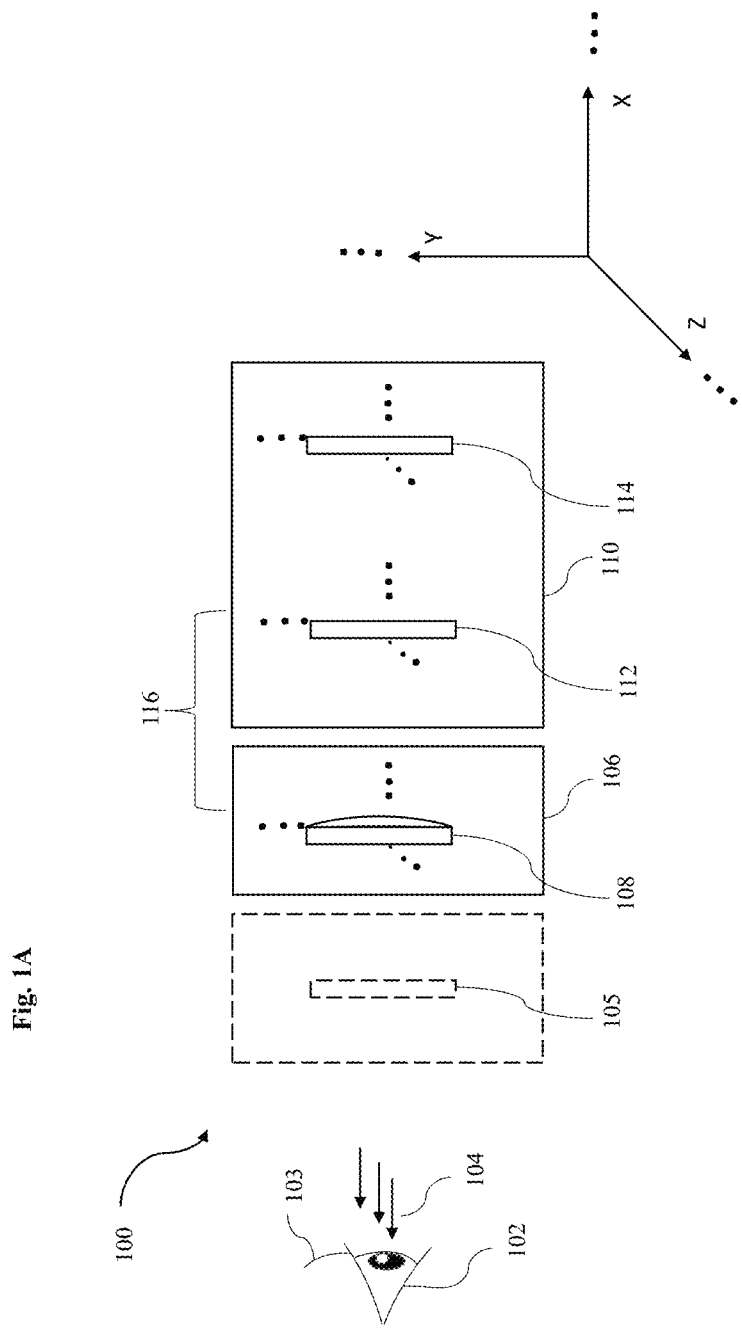
FIG. 1A shows a schematic view of the large FoV AR/VR (variable depth of field sequential imaging for large field of view augmented/virtual reality) system described herein.

In FIG. 1A, the present system is described in a schematic view from a high-level perspective. It is projected that this system and its ancillary components can be integrated into a standalone HMD device, although it is not limited in that configuration. It is also projected that the computational parts of the system, processed through the method steps and through a computer programmable code, may be carried out on a remote system, over a wired or wireless network.

FIG. 1A exemplifies an embodiment of the large FoV AR/VR system 100. The user's 103 eye 102 views some object in the distance whether that object is generated by the large FoV AR/VR system or directly observed in the scenery. The object is perceived when the user's 103 eye 102 is bombarded with the light rays 104 reflecting from that object.

The large FoV AR/VR system 100 may include two components. The variable focusing element 106 and the transparent imaging light valve element 110, and in some embodiments an optional Eye Tracking Element(s) 105 may be included. In some embodiments, the variable focusing element 106 has an array of focusing element(s) 108. The array of focusing element(s) 108 can be made of segmented sub-focusing elements (not pictured) that may be, but not limited to, being operated by microfluidic pumps/compatible drivers/piezo-electric drivers, refractive optics, reflective optics, diffractive optics, holographic optics, meta-lenses/surfaces/materials or even non-tunable focus element(s) can be used whose tunability is achieved by shifting the non-tunable element(s) with desired focal ability into the path of incoming light that is to be focused. The microfluidic pumps/compatible drivers enable the array of focusing element(s) 108 or its segmented sub-focusing elements to be tuned to a particular focal setting and thus vary the imaging characteristics of the array of focusing element(s) 108. However, other technological systems may be used to achieve a segmented sub-focusing elements as the system here is not limited to the microfluidics pumps/compatible drivers, piezo electric drivers, refractive optics, reflective optics, diffractive optics, holographic optics, meta-lenses/surfaces/materials. In some embodiments, the array of focusing element(s) 108 maybe a single or an integrated unit. In some embodiments, the array of focusing element(s) 108 can span in either x, y, or z directions. Thus, the array of focusing element(s) 108 can be a segmented and stacked allowing for miniaturization of the entire system or merging them together for monocular applications.

Tuning the optical power of the array of focusing element(s) 108 to a desirable setting allows the user 103 to perceive the computer-generated object/information at a desired depth. In order to effectuate the focal tunability of the Variable Focusing Element(s), tunable refractive optics, reflective optics, diffractive optics, holographic optics, meta-lenses/surfaces/materials, or even non-tunable focus element(s) can be used whose tunability is achieved by shifting the non-tunable element(s) with desired focal ability into the path of incoming light that is to be focused. However, note that other technological systems may be used to effectuate the focus tunability of the Variable Focusing Element(s) and is not limited to the technological systems described here. Thus, the variable focusing element 106 allows the computer-generated object/information (not pictured) to appear in focus when the variable focusing element 106 is placed close to the eye 102. The variable focusing element 106 can also dynamically change the focusing characteristics fast enough to match the user's 103 eye 102 gaze-direction as well as operate at a speed minimally noticeable to the user's 103 eye 102 (discussed later) allowing the computer-generated object(s)/information, to have desired depth when the variable focusing element 106 is placed close to the eye 102. The computer-generated object/information image is effectuated with use of the transparent image light valve element 110. A potential benefit of the array of focusing element(s) 108 is that it can be varied to match the user's 103 eye 102 prescription so that the user 103 no longer needs to wear eyeglasses or contact lenses in order to see a clear picture. This invariably minimizes and eliminates the need to take into account the eye relief, which is defined as the distance from the last physical surface to the exit pupil.

The transparent imaging light valve element 110 may integrate two complementary parts although in some embodiments a single unit can effectuate the displaying and blocking functions (discussed later). However, for illustrative purposes an embodiment is described here with two distinct parts, the transparent image display element(s) 112 and the blocking element(s) 114. The transparent image display element(s) 112 can be a typical Organic Light Emitting Diode (OLED), a typical liquid-crystal display (LCDs), a typical liquid-crystal-on-silicon (LCOS), integrated with a waveguide hologram-based displays or a compatible transparent display system, but is not limited in this regard. In some embodiments, the transparent image display element(s) 112 can be composed of an array of segmented display elements (not pictured). The array of the segmented display elements can be stacked in three different directions such as x, y, and z; similar to the array of focusing element(s) 108, but in some embodiments, it is not limited to having a similar arrangement of the focusing element(s) 108. The transparent image display element(s) 112 can display visual information in the form of computer-generated objects and computer-generated information. Alternatively, the transparent image display element(s) 112 can also display computer-generated information in order to block or minimize the presence of some real objects. The transparent image display element(s) 112 is operated by the electronics and computational system shown in FIG. 3 of the large FoV AR/VR system 100.

The blocking element(s) 114 can be made of a typical Organic Light Emitting Diode (OLED), a typical liquid-crystal display (LCDs), a typical liquid-crystal-on-silicon (LCOS), an active polarizing filter, or a compatible transparent display system, but is not limited in this regard. In some embodiments, the blocking element(s) 114 can be composed of an array of segmented blocking elements (not pictured). The array of the segmented elements can be stacked in three different directions such as x, y, and z; similar to the array of the focusing element(s) 108 and display element(s) 112. However, in some embodiments, it is not limited to having a similar arrangement to the focusing element(s) 108 or display element(s) 112 except that the blocking element(s) 114 can simultaneously be the last component in the transparent imaging light valve element 110 such that it faces the scenery, or also stacked anywhere between the user's 103 eye 102 and the focusing element(s) 108, or anywhere between the focusing element(s) 108 and display element(s) 112. An example case of this is shown in FIG. 1B. The blocking element(s) 114 can be activated using the electronics and computational system (not pictured) of the large FoV AR/VR system 100 to become or appear opaque, transparent, or any gradient in between. Furthermore, the blocking element(s) 114 can be controlled by the large FoV AR/VR system 100 electronics and computational system (discussed later) to display a cutout of the object or scenery marked to be blocked from the user's 103 eye 102. It is foreseen that the transparent image display element(s) 112 and blocking element(s) 114 can be a combined unit such that a user 103 perceives both a displayed computer-generated objects/information and at the same time a blocked real object in the scenery.

Figure 2A:
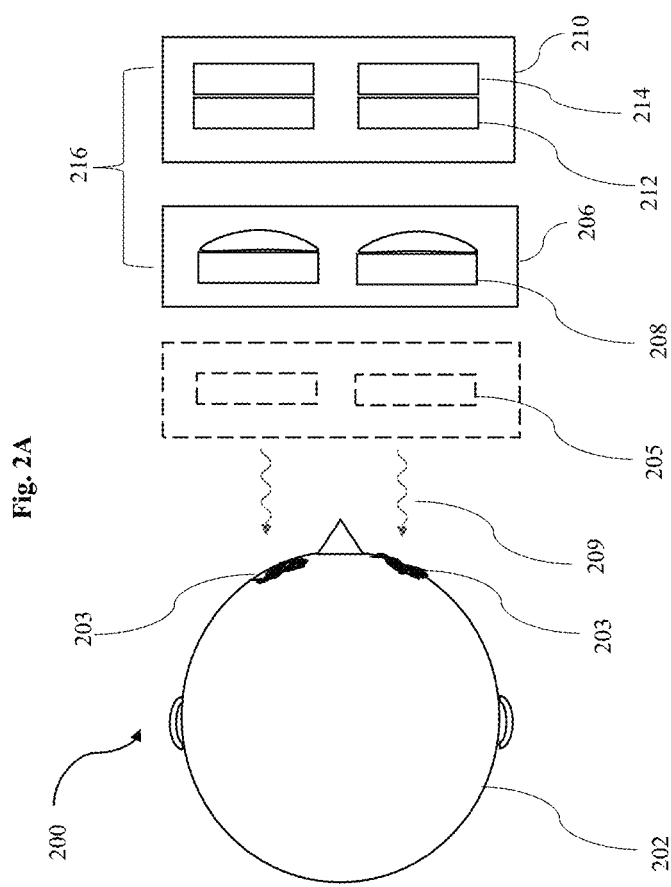
FIG. 2A shows a top down view of an embodiment of the large FoV AR/VR system implemented on a HMD device as described herein.
Figure 2B:
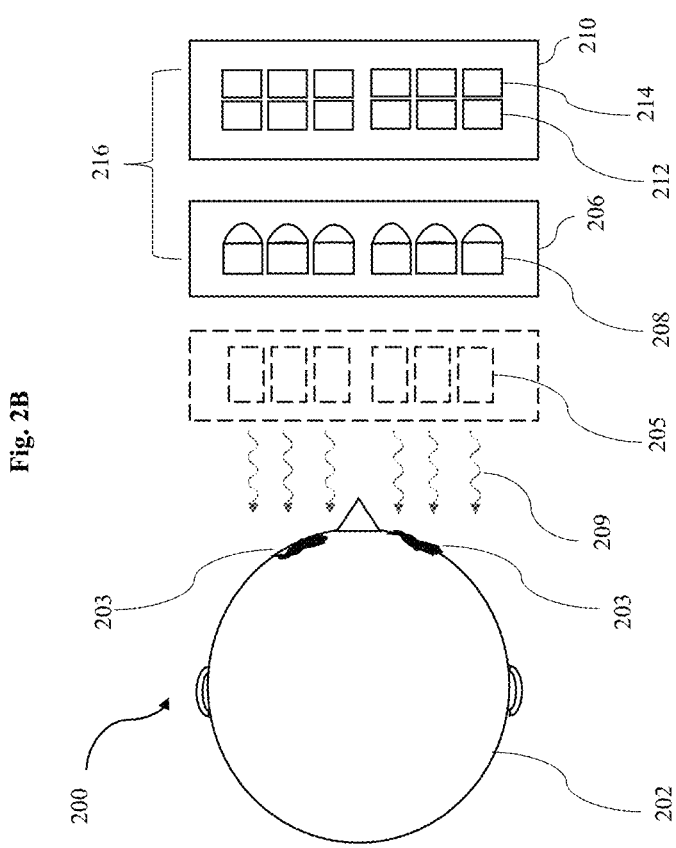
FIG. 2B shows a top down view of an embodiment of the large FoV AR/VR system implemented on a HMD device as described herein.
Figure 2F:
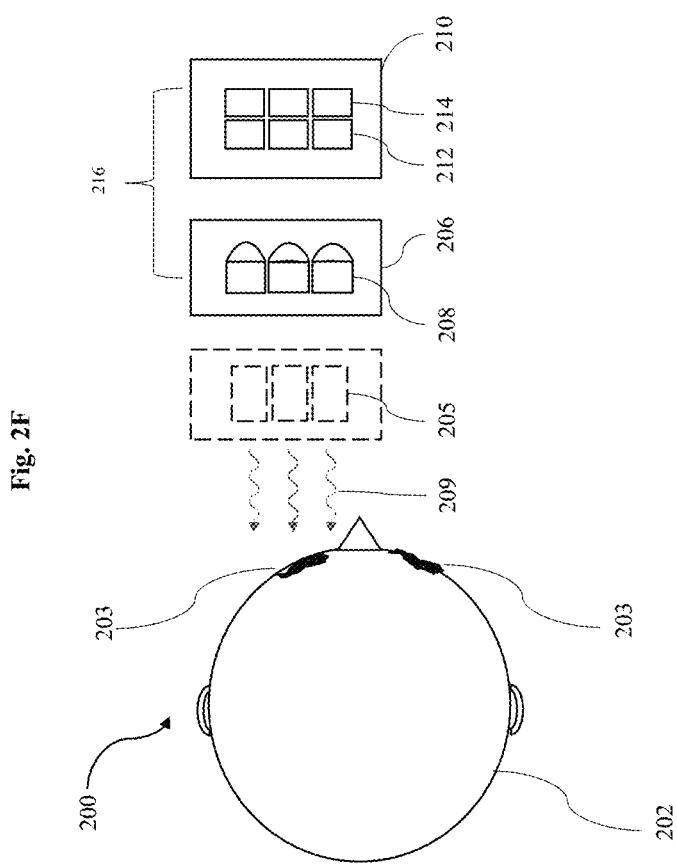
FIG. 2F shows a top down view of an embodiment of the large FoV AR/VR system implemented on a HMD device as described herein.

The combined variable focusing element 106 and the transparent imaging light valve element 110 are integrated in one structure known as the variable depth of field sequential imaging architecture 116. The variable depth of field sequential imaging architecture 116 can be adapted to be operational in stereoscopic settings such as in a HMD device. In some embodiments, it is envisioned that a large FoV AR/VR system 100 may include a set of variable depth of field sequential imaging architectures 116, one for each eye of the user's eye 203, as depicted in FIG. 2A. In other embodiments, the large FoV AR/VR system 100 may include multiple variable depth of field sequential imaging architectures 116, multiple architectures 116 per each of the user's eyes 203 as depicted in FIG. 2B. Yet, in other embodiments, a single variable depth of field sequential imaging architecture 116 is used for the pair of the user's eyes 203 as depicted in FIG. 2C. In other embodiments, some variable depth of field sequential imaging architecture(s) 116 can be designated for both of the user's eyes 203 as well as some variable depth of field sequential imaging architecture(s) 116 dedicated to either of the user's eye 203 as depicted in FIG. 2D. In other embodiments, a variable depth of field sequential imaging architecture 116 is used for either of the user's eyes 203 as depicted in FIG. 2E. In yet another embodiment, a set of variable depth of field sequential imaging architectures 116 can merge the final output into a monocular setup for either of the user's eyes 203, as depicted in FIG. 2F. However, note that other individual and/or combinations of the variable depth of field sequential imaging architectures 116 may be used and is not limited to what is described here.

In FIGS. 2A-2F embodiments of an application of the large FoV AR/VR system 100 is shown in 200, which may be integrated into an HMD device (not pictured) although other configurations and applications are also foreseen. FIGS. 2A-2F depicts the application of the large FoV AR/VR system 100 as a top down view. The user 202 is depicted to be facing or wearing the large FoV AR/VR system 100. The application of the large FoV AR/VR system 200 may include stages such as: the eye-gaze tracker(s) 205, the variable focusing element(s) 206, and the transparent imaging light valve element(s) 210. In this configuration a set of gaze tracker(s) 205 (are optional), a set of the variable focusing element(s) 206, and a set of the transparent imaging light valve element(s) 210 are used for integration into an HMD device. However, this configuration is for illustration purposes only and the large FoV AR/VR system 100 can be integrated in either monoscope or multi-scope applications by use of merging of the output information. Furthermore, in these embodiments, the set of the variable focusing element(s) 206, and a set of the transparent imaging light valve element(s) 210 are integrated and characterized as a single unit that makes up the variable depth of field sequential imaging architecture 216.

The optional eye-gaze tracker(s) 205 may be incorporated into a HMD device in order to measure where the eye is focusing. In some embodiments, the application of the large FoV AR/VR system 200 may have two or more independent eye-gaze tracker(s) 205 situated near each of the eye(s) 203 of the user 202. In some embodiments, only one eye-gaze tracker 205 is implemented. The eye-gaze tracker(s) 205 may be based on infrared, near-infrared sensors, cameras and its compatible electronics; however, other eye-gaze tracking technologies can be implemented as well. The eye-gaze tracker(s) 205 track the movement and/or direction of the eye(s) 203 as the user 202 perceives the light rays emanating from either a real-world object in the scenery (not pictured) or a computer-generated object/information (not pictured) shown in the transparent image display element(s) 212 or on the transparent imaging light valve element(s) 210. The eye(s) 203 movement and/or direction information can be used in the large FoV AR/VR system 100 to generate a focused computer-generated object/information and display it at the correct coordinate plane of the image display screen(s) 212 or on the transparent imaging light valve element(s) 210. Additionally, the eye(s) 203 movement and/or direction information may be used in the large FoV AR/VR system 100 to place the desired outline or mask of computer-generated object/information on the blocking element(s) 214 on the transparent imaging light valve element(s) 210 thereby eliminating or diminishing the "ghosting effect". Furthermore, the large FoV AR/VR system 100 may operate in a passive mode such that the eye-gaze tracker(s) 205 and the variable focusing element(s) 206 function together, or in other embodiments the variable focusing element(s) 206 functions independently, in order to focus the object or scenery that the user 202 is observing. Therefore, the large FoV AR/VR system 100 may perform the normal focusing operations of an eye in case the user 202 suffers from near sightedness and/or far-sightedness.

The application of the large FoV AR/VR system 200 also has two stages of the large FoV AR/VR system 100. The first stage is the variable focusing element(s) 206 and the second stage is the transparent imaging light valve element(s) 210, as discussed above. In some embodiments, the variable focusing element(s) 206 has an array of variably focusing element(s) 208. In some embodiments, the transparent imaging light valve element(s) 210 may include two parts; the transparent image display element(s) 212 and the blocking element(s) 214. In some embodiments, the transparent image display element(s) 212 can be composed of an array of segmented display element(s) 212, and in some embodiments the blocking element(s) 214 can be composed of an array of segmented blocking element(s) 214. In some embodiments, some of the blocking element(s) 214 may be placed between the user's eye 203 and the focusing element(s) 208, or anywhere between the focusing element(s) 208 and display element(s) 212. In some embodiments the transparent imaging light valve element(s) 210 can function both as a display device(s) 212 as well as a blocking element(s) 214.

Figure 3:
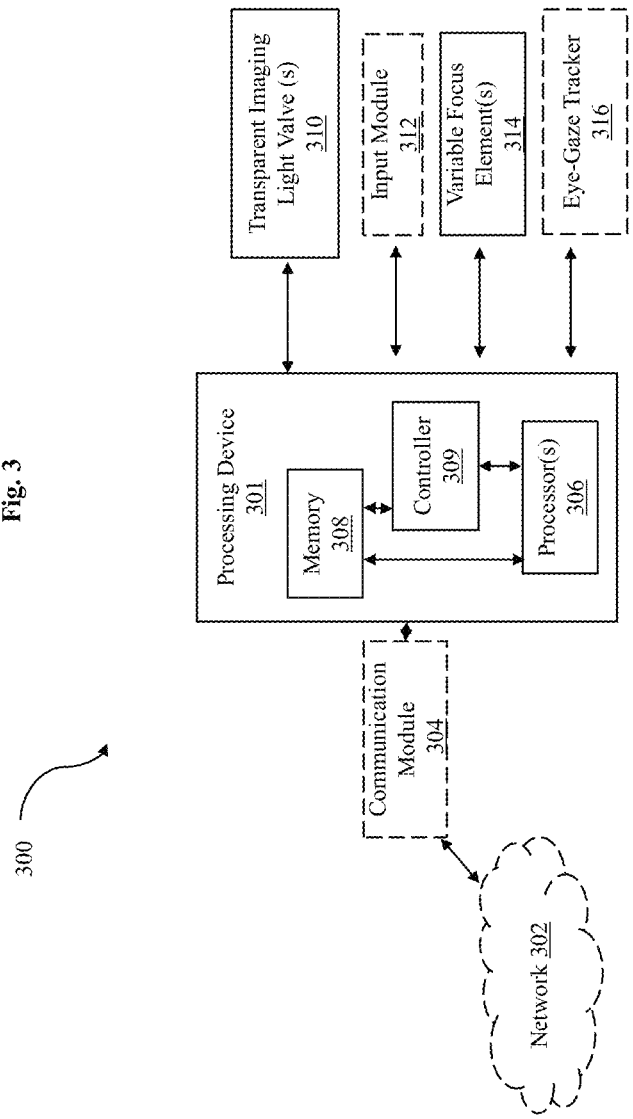
FIG. 3 is a schematic block diagram of the electronics and computational structure of the large FoV AR/VR system as described herein.

FIG. 3 is a block diagram of the variable depth of field sequential imaging for large FoV augmented/virtual reality's electronic and computational modules 300 that control the operation of the large FoV AR/VR system 100.

The processing device 301 is a computer such as a personal computer (pc), a tablet pc, a smart-phone or the like. The processing device 301 carries on all the operations and computational aspects of the large FoV AR/VR system 100 using a processor 306, a memory 308 and a controller 309. The processor can be a Central Processing Unit (CPU), Graphics Processing Unit (GPU), Virtual Processing Unit (VPU), or a series of processors and/or microprocessors, but are not limited in this regard, connected in series or parallel to execute the functions relayed through the memory 308 which may house the software programs and/or sets of instructions. The processor 306 and memory 308 are interconnected via bus line or other intermediary connections. The processor 306 and controller 309 are also interconnected via bus line or other intermediary connections. The controller 309 sends control signals to the other components of the variable depth of field sequential imaging for large FoV augmented/virtual reality's electronic and computational modules 300. The memory can be a conventional memory 308 device such as RAM (Random Access Memory), ROM (Read Only Memory) or other volatile or non-volatile basis that is connected to the processor(s) 306 and to the controller 309. The memory 308 includes one or more memory devices, each of which includes, or a plurality of which collectively include a computer readable storage medium. The computer readable storage medium may include a read-only memory (ROM), a flash memory, a floppy disk, a hard disk, an optical disc, a flash disk, a flash drive, a tape, a database accessible from a network, and/or any storage medium with the same functionality that can be contemplated by persons of ordinary skill in the art to which this disclosure pertains.

The processing device 301 is connected to various other aspects of the variable depth of field sequential imaging for large FoV augmented/virtual reality's electronic and computational modules 300. For example, the processing device 301 is connected to a communication module 304 which enables it to communicate with remote devices or servers on a wired or on a wireless basis. The communication module in return can communicate with a network 302 such as a cloud or a web, on a need to basis. Thereby, receiving operational instructions and/or image information/data from a source other than what is available to the processor(s) 306 and/or the memory 308. In some embodiments, the variable depth of field sequential imaging for large FoV augmented/virtual reality's electronic and computational modules 300 does not have a communication module 304 and thus does not communicate with other devices over the web and/or network 302.

The processing device 301 is also connected to the transparent imaging light valve element(s) 310. The processing device 301 enables the operation of the transparent imaging light valve(s) 310 by initiating the transparent image display element(s) 212 and the blocking element(s) 214. In some embodiments, the transparent imaging light valve(s) 310 may be a single unit that carries on both tasks of displaying computer generated objects/information and blocking the entering light. The processor(s) 306 sends operational signals to the controller 309, which in turn operates the function of the transparent imaging light valves(s) 310. The controller 309 thus drives the displaying and blocking function of the transparent imaging light valve(s) 310 once instructions have executed on the processor(s) 306 as received from the memory 308 or through the communication module 304.

The processing device 301 is also connected to the input module 312 in order to intake the user's desired parameters. Desired parameters such as whether the user wishes to correct the vision based on his prescription value, to select an operational mode of the large FoV AR/VR system 100, to enable eye-gaze tracking, or to set the duty cycle can be implemented using the input module 301. Furthermore, the input module 301 can be achieved using voice commands, touchscreens, incorporation of a stylus pen, hand gestures or body "language." In some embodiments, the input module 312 is an optional component.

The processing device 301 is also connected to the variable focus element(s) 314 in order to tune the focal length of element(s) to achieve optimum focal depth. The processor 306 sends operational signals to the controller 309, which in turn operates the function of the variable focus element(s) 314 using for example microfluidic pumps/compatible drivers/piezo-electric drivers, refractive optics, reflective optics, diffractive optics, holographic optics, meta-lenses/surfaces/materials or even non-tunable focus element(s) whose tunability is achieved by shifting the non-tunable element(s) with desired focal ability into the path of incoming light that is to be focused, or the like. However, other technological systems may be used to achieve a segmented sub-focusing elements as the system here is not limited to the microfluidics pumps/compatible drivers, piezo electric drivers, refractive optics, reflective optics, diffractive optics, holographic optics, meta-lenses/surfaces/materials or even non-tunable focus element(s) whose tunability is achieved by shifting the non-tunable element(s) with desired focal ability into the path of incoming light that is to be focused, or the like. The controller 309 is able to control variable focus element(s) 314 that may be made of an array of variable focus elements spanning in the x, y, or z directions.

The processing device 301 is also connected to the optional eye-gaze tracker(s) 316 in order to locate the direction the eye(s) is directing its view. The processor 306 sends operational signals to the controller 309, which in turn operates the function of the eye-gaze tracker(s) 316. It is envisioned that the eye-gaze tracker(s) uses infrared, near infrared or camera-based sensors to detect the direction of the eye(s). In some embodiments, the eye-gaze tracker(s) 316 may be multiple trackers and integrated in various configurations. In some embodiments, the eye-gaze tracker(s) 316 may be an optional component.

In some embodiments, the processing device 301 may further include signal transceivers (not shown) for transmitting and receiving signals between the processing device 301 and the communication module 304, signals between the processing device 301 and the transparent imaging light valve(s) 310, signals between the processing device 301 and the input module 312, signals between the processing device 301 and the variable focus element(s) 314, and/or signals between the processing device 301 and the eye-gaze tracker(s) 316.

Figure 4:
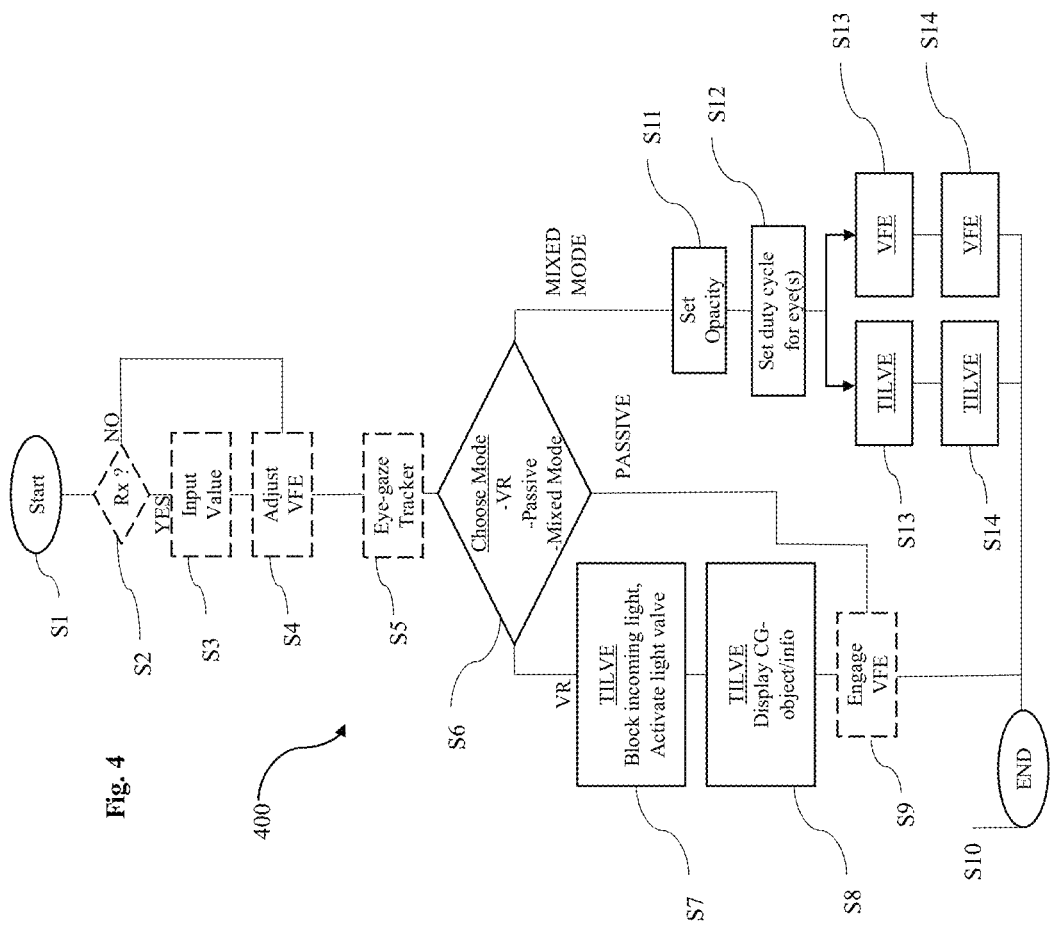
FIG. 4 illustrates a flowchart of an embodiment of the large FoV AR/VR method as described herein.

FIG. 4 depicts an exemplary flowchart illustrating the variable depth of field sequential imaging for large FoV AR/VR method 400. This method 400 is described for an embodiment (i.e. FIG. 1A) of the large FoV AR/VR system 100 which may be composed of a single variable depth of field sequential imaging architecture 116, note however other embodiments (i.e. FIG. 1B) of the system may be used to effectuate this method 400. Furthermore, other embodiments comprising of one or more various variable depth of field sequential imaging architecture(s) 216 as depicted in FIGS. 2A-2F, may have each of their individual architecture(s) 216 operate in a similar manner to what is described in FIG. 4. In step S1, the method 400 engages the variable depth of field sequential imaging for large FoV augmented/virtual reality's electronic and computational modules 300 that control the operation of the large FoV AR/VR system 100. In step S2, the user 103 is prompted to choose whether he/she wants to input his/her prescription for correcting his/her vision. The user 103 can interact with the large FoV AR/VR system 100 through the input module 312. In step S3, the user 103 sets his/her prescription value so that the Variable Focus Elements (VFE(s)) 314/106 can correctly account for the user's 102 eye power. This parameter can be entered into large FoV AR/VR system 100 through the input module 312. In step S4, large FoV AR/VR system 100 adjusts the VFE(s) 314/106 to match the user's 103 prescription value such that the user 103 no longer has to wear corrective lenses to see the image in focus. In step S5, the user 103 can engage the eye-gaze tracker(s) 316/105 in order to track the direction and/or movement of the user's 103 eye(s) 102. The user 103 can engage the eye-gaze tracker(s) 316/105 at step S5 through the input module 312. This is done in order to later adjust the VFE(s) 314/106 so that whatever object the user 103 is observing, can be dynamically adjusted so that at all times the objects appears in focus. In some embodiments, steps S2-S5 are optional.

In step S6, the user 103 may decide, through the input module 312, as to the mode of operation the user 103 desires of the large FoV AR/VR system 100. The user 103 can chose between a fully immersive VR mode, a passive mode or a mixed mode.

If the user 103 picks the VR mode, the TILVE(s) 310/110 will be activated. Once it is activated, the incoming light in for the user's eye 103 is blocked. At the same time, the TILVE 310/110 or array of TILVEs 310/110 is/are activated to display to the user 103 some Computer-Generated (CG) objects/information. At step S8, the TILVE 310/110 or array of TILVEs 310/110 actually displays the CG-objects/information to the user 103.

In step S9, the large FoV AR/VR system 100 engages the VFE(s) 314/106 to adjust the focusing element(s) 108 in order to provide/perceptually simulate a proper depth for the CG-objects/information displayed. In some embodiments, further operation of the VFE(s) 314/106 via S9 may be optional as well as the engagement of the gaze tracker(s) 316/105, which would allow the VFE(s) 314/106 to actively change their focal power to provide/perceptually simulate a depth for the CG-objects/information displayed, dictated by the set of instructions on the processing device 301.

Once the user 103 finishes the VR mode, he/she can terminate the routine at S10.

Alternatively, if the user 103 picks the passive mode at step S6; he/she can operate the large FoV AR/VR system 100 without activating or engaging the TILVE(s) 310/110. However, the user 103 can in some embodiments engage the VFE(s) 314/106 in case the user 103 has selected to input his/her prescription value at step S3 and has selected the eye-gaze tracker(s) 316/105 at step S5. In that scenario, the user 103 can observe the real-world scenery without wearing corrective lenses because the VFE(s) 314/106, in combination with the eye-gaze tracker(s) 316/105 will dynamically be adjusting the focal depth for optimum conditions. If the user 103 has not selected the eye-gaze tracker(s) 316/105 at step S5, then instead, the large FoV AR/VR system 100 will adjust the VFE(s) 314/106 based on the user's 103 inputted prescription value.

Once the user 103 exits the passive mode, he/she can terminate the routine at S10.

In case the user 103 selects to use the large FoV AR/VR system 100 in a mixed mode at step S6, the user 103 can then set the opacity of the overlaying of CG-objects/info with use of the TILVE(s) 314/110 at step S11. Setting of the opacity level is achieved through the use of the input module 312 in order to diminish or eliminate the effect of "ghosting." This is employed in a mixed AR/VR environment such that the overlaying of the CG-object/information is perceived to be opaque rather than transparent. In some embodiments, the user 103 is able to adjust the opacity level on a continual basis as this branch (steps S11-S14) of the method 400 may be set to run in a continuous loop.

The user 103 can then set the duty cycle, through the input module 312, for the eye(s) 102 at step S12. The duty cycle is controlled and operated by the processing device 301 by employing an exemplary circuit or set of instructions, such as a Pulse Width Modulation (PWM). However, other compatible circuits or set of instructions are foreseen and it is not limited to a PWM implementation. For example, the user 103 can set the duty cycle at step S12 to a setting of 50/50. Meaning that the eye 102 gets an equal operational time as the steps cycle through from S13-S14 in a continuous loop. In a 50/50 duty cycle rate, the eye(s) 102 perceives the real-world scenery and the CG-object/information for the same amount of time, per second. If at S12, the user 103 selects an unequal distribution of the duty cycle (e.g. 75/25) biased towards the real-world scenery, the CG-object/information is seen three times as less as the real-word scenery.

In certain circumstances however, this may be desirable. For example, if the real-world scenery is darker than the CG-object/information, the user 103 can increase the duty cycle for the real-world scenery while decreasing the duty cycle for the CG-object/information. The eye(s) 102 thus receives more light from the real-world scenery in comparison to the CG-object/information. Thereby, the brightness of the real-world scenery is perceived brighter and the CG-object/information is perceived as darker. Conversely, setting the duty cycle in the opposite direction, when the real-world scenery is brighter than the CG-object/information, allows the eye(s) 102 to perceive the real-world scenery as darker than the CG-object/information.

In other circumstances, the user 103 may adjust the duty cycle at step S12 to 100/0, biased towards the CG-object/information. This effectively makes the large FoV AR/VR system 100 operate as a VR only system.

Figure 7A:
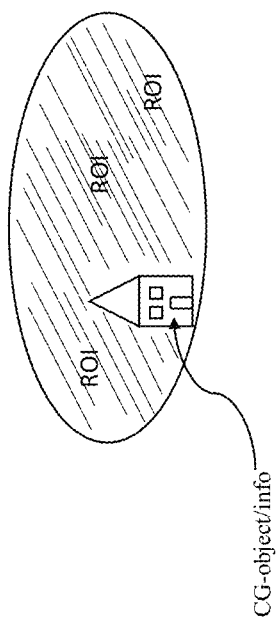
FIG. 7A-7B illustrates a visual representation, from a user's perspective, employing any one of the described embodiments in a "single visual application" case.
Figure 7B:
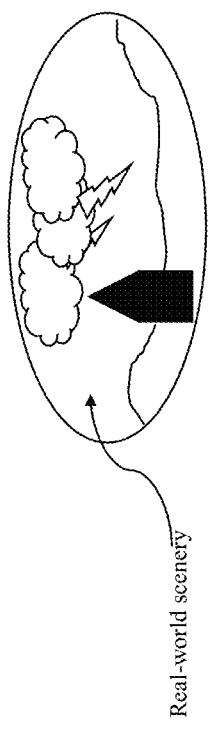

In step S13, the large FoV AR/VR system 100 initiates both the TILVE(s) 310/110 and VFE(s) 314/106 components in the following format, as visualized in the eye(s) of FIG. 7A. For the eye 102, the TILVE(s) 310/110 activates the blocking element(s) 114 and blocks any incoming light projected from the real-world scenery. Then the TILVE(s) 310/110 displays a CG-object/information on the transparent image display element(s) 112. Furthermore, the area surrounding the CG-object/information, deemed as the Region of Interest (ROI), is displayed as blacked out on the transparent image display element(s). Therefore, the eye 102 only sees the CG-object/information and nothing more. At the same time, for the eye 102, the VFE(s) 314/106 adjusts the focal depth in order to view the CG-object/information in focus. If a prescription value was set in steps S2-S4, then the VFE(s) 314/106 takes that into account when adjusting the focal depth. In step S14 the large FoV AR/VR system 100 initiates both the TILVE(s) 310/110 and VFE(s) 314/106 components in the following format, as visualized in the eye(s) of FIG. 7B. For the eye 102, the TILVE(s) 310/110 activates the blocking element(s) 114 and allowing the light emanating from the real-world scenery to pass through. Then, the TILVE(s) 310/110 displays a negated CG-object/info, using the transparent image display element(s) 112, with the opacity level set at step S11. The negated CG-object/info is placed at the adjusted location where the actual CG-object/info was originally rendered to be showing in the eye 102. The negated CG-object/info is a mask or blacked-out shape of the rendered CG-object/info. If the opacity level is set to high, then the image in the eye 102 shows the negated CG-object/info to be black. In this scenario, the "ghosting" effect is eliminated or diminished as the rendered CG-object/info is perceived to be opaque when the brain registers the image from both eyes and blends it together. If the opacity level is set to moderate to low, the negated CG-object/info looks transparent and the "ghosting" effect is visible as the rendered CG-object/info is perceived to be transparent when the brain registers the image from both eyes and blends it together.

Because the mixed mode scenario is on a continual loop, steps S11-S14, and S13-S14 may be repeated at a certain rate such that the brain perceives the merging of the information provided in the eye 103 at S13 and S14, thereby combining the CG-object/information with the modified real-world scenery in order to eliminate or diminish the problem of ghosting. This effect allows for a large FoV and control of perceived distance or depth of field, eliminating or diminishing the need for the user 103 to use corrective lenses and places the VFE(s) 314/106 and TILVE(s) 110 in front of the user's eye(s) 102 and along their optical axis.

At step S10, the user 103 then terminates the method 400.

The method 400 could be implemented on a "single vision application" (i.e. FIG. 1A-1B, 2C, 2E, 2F) or in a case where both eyes 102 are presented substantially with the same image at the same time (i.e. FIGS. 2A-2B (given that the multiple variable depth of field sequential imaging architecture(s) 216 operate in unison)) in S13 and both eyes 102 are subsequently presented with another substantially similar image at S14, where those images at each step may be merged for "single vision applications." However, integration of multiple variable depth of field sequential imaging architecture(s) 216, as depicted in FIGS. 2A-2F, may be employed such that the overall resulting images presented to either eye 102—at their respective steps of either S13 or S14—by the multiple variable depth of field sequential imaging architecture(s) 216 may operate in an asynchronous schema and independent of one another.

Details of the method 400 can be ascertained with reference to the paragraphs above, and a description in this regard will not be repeated herein.

Figure 5A:
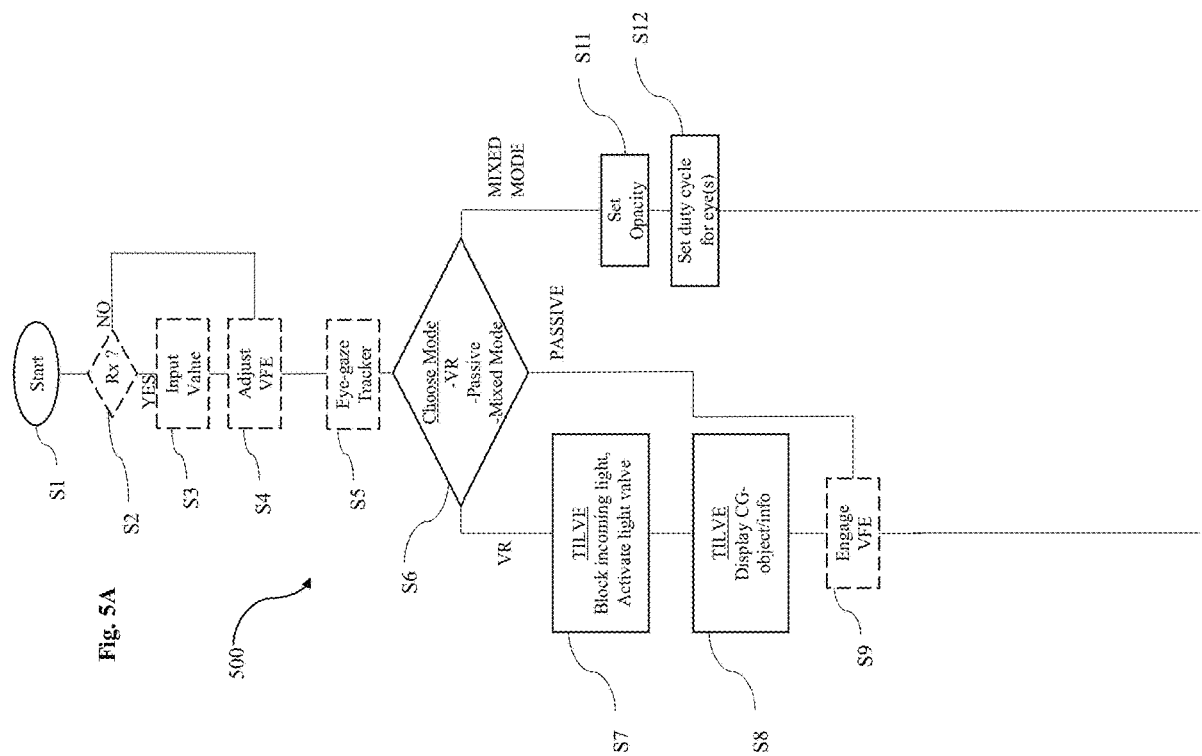
FIG. 5A-5B illustrates a flowchart of the large FoV AR/VR method as described herein.
Figure 5B:
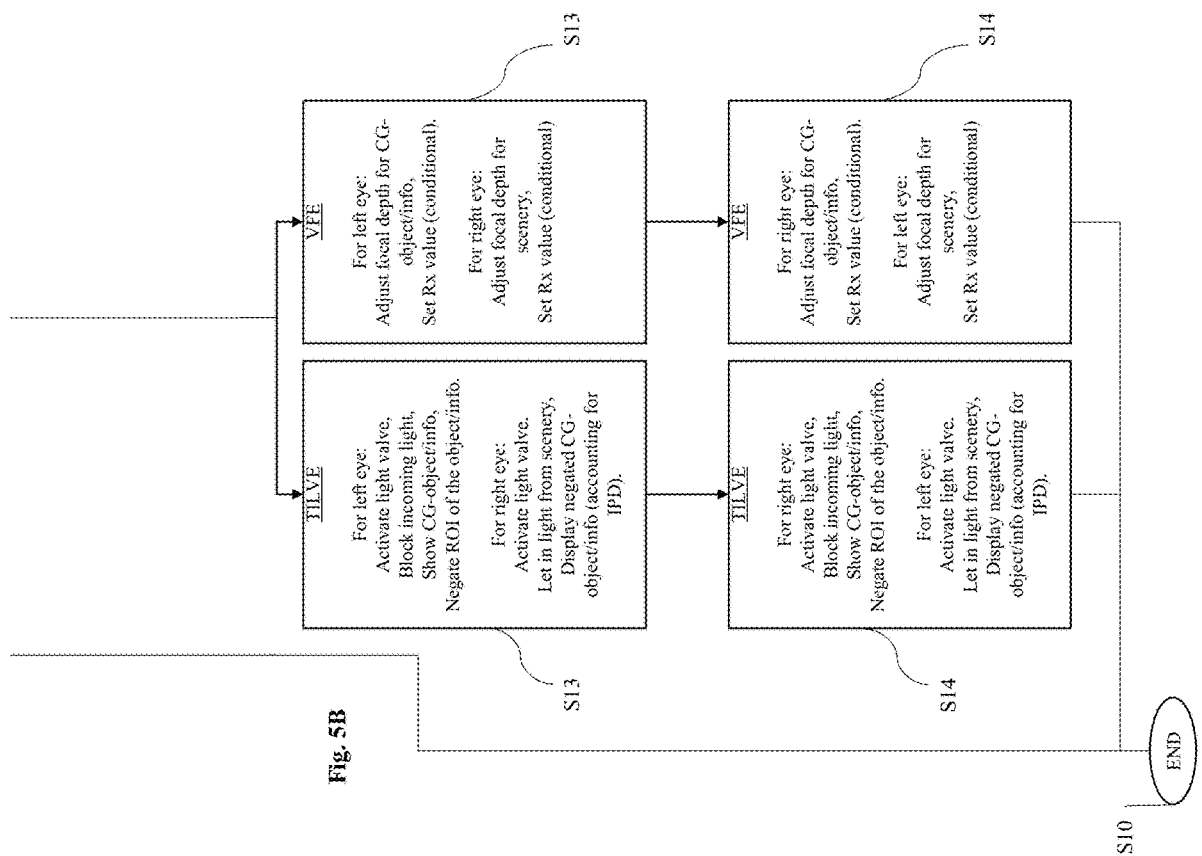

As for FIGS. 5A-5B, what is described is a method in which two or more architectures may operate in synchronous schema.

FIGS. 5A-5B, depict an exemplary flowchart illustrating the variable depth of field sequential imaging for large FoV augmented/virtual reality method 500, for an embodiment of the large FoV AR/VR system 100/200. In step S1, the method 500 engages the variable depth of field sequential imaging for large FoV augmented/virtual reality's electronic and computational modules 300 that control the operation of the large FoV AR/VR system 100/200. In step S2, the user 202 is prompted to choose whether he/she wants to input his prescription for correcting his vision. The user 202 can interact with the large FoV AR/VR system 100/200 through the input module 312. In step S3, the user 202 sets his/her prescription value so that the Variable Focus Elements (VFE(s)) 314/206 can correctly account for the user's 202 eye power. This parameter can be entered into large FoV AR/VR system 100/200 through the input module 312. In step S4, large FoV AR/VR system 100/200 adjusts the VFE(s) to match the user's 202 prescription value such that the user 202 no longer has to wear corrective lenses to see the image in focus. In step S5, the user 202 can engage the eye-gaze tracker(s) 316/205 in order to track the direction and/or movement of the user's 202 eyes. The user 202 can engage the eye-gaze tracker(s) 316/205 at step S5 through the input module 312. This is done in order to later adjust the VFE(s) 314/206 so that whatever object the user 202 is observing, can be dynamically adjusted so that at all times the objects appears in focus. In some embodiments, steps S2-S5 are optional.

In step S6, the user 202 may decide, through the input module 312, as to the mode of operation the user 202 desires of the large FoV AR/VR system 100/200. The user 202 can chose between a fully immersive VR mode, a passive mode or a mixed mode.

If the user 202 picks the VR mode, the TILVE(s) 310/210 will be activated. Once it is activated, the incoming light in both for the first eye and the second eye is blocked. In alternative embodiments, where the first eye and second eye elements are combined, only one TILVE 310/210 or array of TILVEs 310/210 is/are activated to block the light. At the same time, the TILVE 310/210 or array of TILVEs 310/210 is/are activated to display to the user 202 some Computer-Generated (CG) objects/information. At step S8, the TILVE 310/210 or array of TILVEs 310/210 actually displays the CG-objects/information to the user 202.

In step S9, the large FoV AR/VR system 100/200 engages the VFE(s) 314/206 to adjust the focusing element(s) 208 in order to provide/perceptually simulate a proper depth for the CG-objects/information displayed. In some embodiments, further operation of the VFE(s) 314/206 via S9 may be optional as well as the engagement of the gaze tracker(s) 316/205, which would allow the VFE(s) 314/206 to actively change their focal power to provide/perceptually simulate a depth for the CG-objects/information displayed, dictated by the set of instructions on the processing device 301.

Once the user 202 finishes the VR mode, he/she can terminate the routine at S10.

Alternatively, if the user 202 picks the passive mode at step S6; he/she can operate the large FoV AR/VR system 100/200 without activating or engaging the TILVE(s) 310/210. However, the user 202 can in some embodiments engage the VFE(s) 314/206 in case the user 202 has selected to input his/her prescription value at step S3 and has selected the eye-gaze tracker(s) 316/205 at step S5. In that scenario, the user 202 can observe the real-world scenery without wearing corrective lenses because the VFE(s) 314/206, in combination with the eye-gaze tracker(s) 316/205 will dynamically be adjusting the focal depth for optimum conditions. If the user has not selected the eye-gaze tracker(s) 316/205 at step S5, then instead, the large FoV AR/VR system 100/200 will adjust the VFE(s) 314/206 based on the user's 202 inputted prescription value.

Once the user 202 exits the passive mode, he/she can terminate the routine at S10.

In case the user 202 selects to use the large FoV AR/VR system 100/200 in a mixed mode at step S6, the user 202 can then set the opacity of the overlaying of CG-objects/info with use of the TILVE(s) 314/210 at step S11. Setting of the opacity level is achieved through the use of the input module 312 in order to diminish or eliminate the effect of "ghosting." This is employed in a mixed AR/VR environment such that the overlaying of the CG-object/information is perceived to be opaque rather than transparent. In some embodiments, the user 202 is able to adjust the opacity level on a continual basis as this branch (steps S11-S14) of the method 500 may be set to run in a continuous loop.

The user 202 can then set the duty cycle, through the input module 312, for the eye(s) 203 at step S12. The duty cycle is controlled and operated by the processing device 301 by employing an exemplary circuit or set of instructions, such as a Pulse Width Modulation (PWM). However, other compatible circuits or set of instructions are foreseen and it is not limited to a PWM implementation. For example, the user 202 can set the duty cycle at step S12 to a setting of 50/50. Meaning that each eye 203 gets an equal operational time as the steps cycle through from S13-S14 in a continuous loop. In a 50/50 duty cycle rate, each eye 203 perceives the real-world scenery and the CG-object/information for the same amount of time, per second. If at S12, the user 202 selects an unequal distribution of the duty cycle (e.g. 75/25) biased towards the real-world scenery, the CG-object/information is seen three times as less as the real-word scenery.

In certain circumstances however, this may be desirable. For example, if the real-world scenery is darker than the CG-object/information, the user 202 can increase the duty cycle for the real-world scenery while decreasing the duty cycle for the CG-object/information. The eye(s) 203 thus receives more light from the real-world scenery in comparison to the CG-object/information. Thereby, the brightness of the real-world scenery is perceived brighter and the CG-object/information is perceived as darker. Conversely, setting the duty cycle in the opposite direction, when the real-world scenery is brighter than the CG-object/information, allows the eye(s) 203 to perceive the real-world scenery as darker than the CG-object/information.

In other circumstances, the user 202 may adjust the duty cycle at step S12 to 100/0, biased towards the CG-object/information. This effectively makes the large FoV AR/VR system 100/200 operate as a VR only system.

Figure 6A:
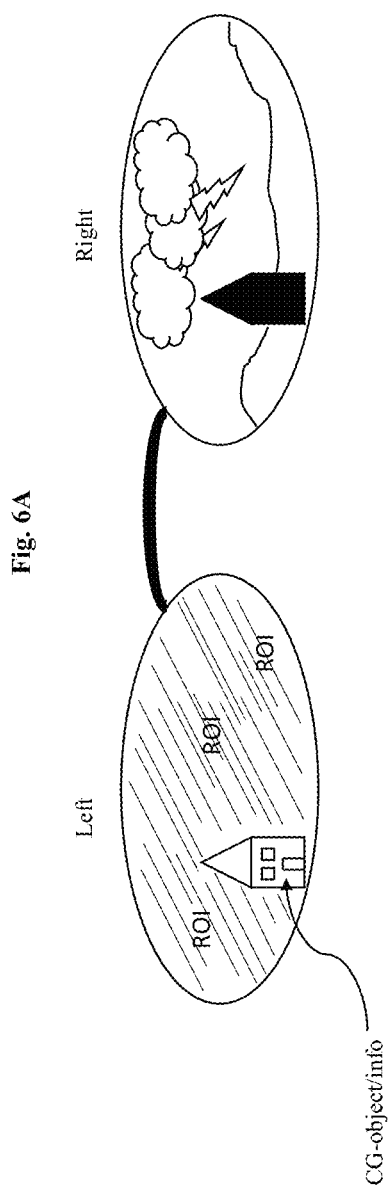
FIG. 6A-6B illustrates a visual representation, from a user's perspective, employing any one of the described embodiments using its respective method.

In step S13, the large FoV AR/VR system 100/200 initiates both the TILVE(s) 310/210 and VFE(s) 314/206 components in the following format, as visualized in FIG. 6A. For the left eye 203, the TILVE(s) 310/210 activates the blocking element(s) 114/214 and blocks any incoming light projected from the real-world scenery. Then the TILVE(s) 310/210 displays a CG-object/information on the transparent image display element(s) 112/212. Furthermore, the area surrounding the CG-object/information, deemed as the Region of Interest (ROI), is displayed as blacked out on the transparent image display element(s). Therefore, the left eye 203 only sees the CG-object/information and nothing more. At the same time, for the left eye 203, the VFE(s) 314/206 adjusts the focal depth in order to view the CG-object/information in focus. If a prescription value was set in steps S2-S4, then the VFE(s) 314/206 takes that into account when adjusting the focal depth. For the right eye 203 however, the TILVE(s) 310/210 activates the blocking element(s) 114/214 allowing the light to emanate from the real-world scenery to pass through. Then, the TILVE(s) 310/210 displays a negated CG-object/info, using the transparent image display element(s) 112/212, with the opacity level set at step S11 and further offsetting it based on the Inter Pupillary Distance (IPD). The negated CG-object/info is placed at the adjusted location where the actual CG-object/info is rendered to be showing in the left eye 203. The negated CG-object/info is a mask or blacked-out shape of the rendered CG-object/info. If the opacity level is set to high, then the image in the right eye 203 shows the negated CG-object/info to be black. In this scenario, the "ghosting" effect is eliminated or diminished as the rendered CG-object/info is perceived to be opaque when the brain registers the image from both eyes and blends it together. If the opacity level is set to moderate to low, the negated CG-object/info looks transparent and the "ghosting" effect is visible as the rendered CG-object/info is perceived to be transparent when the brain registers the image from both eyes and blends it together. At the same time, for the right eye 203, as the TILVE(s) 310/210 is operating, the VFE(s) 314/206 adjusts the focal depth to allow proper focusing of the real-world scenery. Again, if the user 202 has entered his/her prescription values steps S2-S4, then the VFE(s) 314/206 takes this into account when adjusting the focal depth.

Figure 6B:
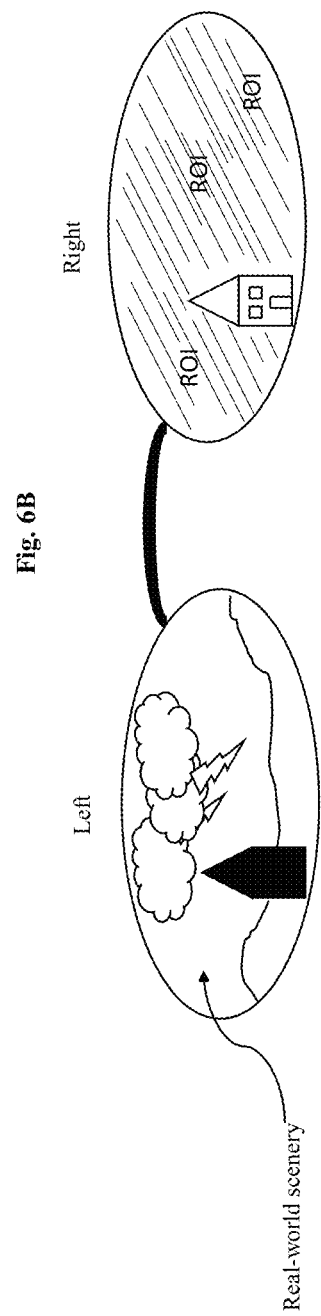

In step S14, the large FoV AR/VR system 100/200 flips the assignment where the right eye 203 is shown the CG-object/info and the left eye 203 sees the real-world scenery, as visualized in FIG. 6B. Because the mixed mode scenario is on a continual loop, steps S11-S14, and S13-S14 may be repeated at a certain rate such that the brain perceives the merging of the information provided in the left eye 203 and the right eye 203, thereby combining the CG-object/information with the modified real-world scenery in order to eliminate or diminish the problem of ghosting. The method 500 can alternatively show the CG-object/ information on the right eye and the real-world scenery on the left eye or vice-a versa. This effect allows for a large FoV and control of perceived distance or depth of field, eliminating or diminishing the need for the user 202 to use corrective lenses and places the VFE(s) 106/206 and TILVE(s) 110/210 in front of the user's eyes 203 and along their optical axis.

At step S10, the user 202 then terminates the method 500.

Details of the method 500 can be ascertained with reference to the paragraphs above, and a description in this regard will not be repeated herein.

It should be noted that, in some embodiments, the method 400/500 may be implemented as a computer program. When the computer program is executed by a computer, an electronic device, or the one or more processors 306 in FIG. 3, carries on the method 400/500 as shown in FIGS. 4, 5A-5B. The computer program can be stored in a non-transitory computer readable medium such as a ROM, a flash memory, a floppy disk, a hard disk, an optical disc, a flash disk, a flash drive, a tape, a database accessible from a network, or any storage medium with the same functionality that can be contemplated by persons of ordinary skill in the art to which this disclosure pertains.

In addition, it should be noted that in the operations of the following method 400/500, no particular sequence is required unless otherwise specified. Moreover, the following operations may also be performed simultaneously, or the execution times thereof may at least partially overlap.

Furthermore, the operations of the following method 400/500 may be added to, replaced, and/or eliminated as appropriate, in accordance with various embodiments of the present disclosure.

Through the operations of various embodiments described above, a user friendly I/O operation interface in a VR or AR environment may be implemented such as the one indicated by the input module 312 of FIG. 3.

Although the present disclosure has been described in considerable detail with reference to certain embodiments thereof, other embodiments are possible. Therefore, the scope of the appended claims should not be limited to the description of the embodiments contained herein.

What is claimed is:

1. A variable depth of field sequential imaging system comprising:
   at least one transparent image display element placed along an optical axis of a user's eye;
   at least one variable focus element placed along the optical axis of the user's eye, and situated between the at least one transparent image display and the user's eyes;
   at least one light valve element placed along the optical axis of the user's eye preceded by the at least one transparent image display element which is further preceded by the at least one variable focus element which is further preceded by the user's eye;
   one or more processors;
   a controller communicatively coupled to the one or more processors;
   a memory communicatively coupled to the controller and to the one or more processors; and
      one or more set of instructions, wherein the one or more set of instructions are stored in the memory and configured to be executed by the one or more processors, and in concert with the controller, wherein the one or more set of instructions include executable instructions to:
         generate a computer-generated information on the at least one transparent image display element;
         control pass-through of real-world scenery through the at least one light valve element; and
         change the focal power of the at least one variable focus element faster than the user's eye is capable of perceiving.

2. The variable depth of field sequential imaging system of claim 1, wherein the at least one transparent image display element, the at least one variable focus element, and the at least one light valve element is capable of being scaled up to include multiples of the set of at least one transparent image display element, the at least one variable focus element and the least one light valve element where the multiples of the set function independently of one another, asynchronously with one another, dependently from one another, in-sync with one another, or in any combination.

3. The variable depth of field sequential imaging system of claim 1, wherein the system further comprises an input module communicatively coupled to the processor that has one or more set of instructions including executable instructions to allow the user to input the user's eye prescription value, select an operational mode, set opacity, or set a duty cycle.

4. The variable depth of field sequential imaging system of claim 3, wherein the system further comprises:
   an eye-gaze tracker; and
   the eye-gaze tracker is enabled by the user with the input module.

5. The variable depth of field sequential imaging system of claim 1, wherein the system is implemented on a head-mounted device.

6. The variable depth of field sequential imaging system of claim 1, wherein the system is implemented on a visual device.

7. A method of implementing a variable depth of field sequential imaging, the method comprising:
   controlling at least one transparent image display element to show a computer-generated object and to display a surrounding region of the computer-generated object as black;
   controlling at least one light valve element to block light emanating from a real-life scenery;
   controlling at least one variable focus element to adjust its focal power such that the computer-generated object is in focusable distance for a user's eye;
   controlling at least one transparent image display element to show a negated artifact, of desired intensity, of the computer-generated object and placing the negated artifact in a position relative to a corresponding position of the computer-generated object;
   controlling at least one light valve element to allow light emanating from the real-life scenery; and controlling at least one variable focus element to adjust its focal power such that the real-life scenery is in focus for the user's eye.

8. The method of claim 7, wherein the method:
controlling at least some of the transparent image display element(s), the light valve element(s) and the variable focus element(s) either independently, dependently, asynchronously, synchronously or in any combination.

9. The method of claim 7, further comprising:
receiving a user input for an opacity value that directly impacts the intensity of the negated artifact; and
receiving a user input for a duty cycle that directly impacts the percentage of the period that the at least one transparent image display element(s), the at least one light valve element(s), and the at least one variable focus element(s) operates per cycle.

10. The method of claim 8, further comprising:
receiving a user input for an opacity value that directly impacts the intensity of the negated artifact; and
receiving a user input for a duty cycle that directly impacts the percentage of the period that the at least one transparent image display element(s), the at least one light valve element(s), and the at least one variable focus element(s) operates per cycle.

11. A method of implementing a variable depth of field sequential imaging, the method comprising:
receiving a user input that sets an operational mode for the method between a virtual reality mode, a passive mode or a mixed mode;
receiving a user input that sets the user's eye prescription value; and
controlling at least one variable focus element to adjust an optical output of any of the operational modes whereby corrective lenses are unnecessary and eye-relief is minimized for a viewing experience.

12. The method of claim 11, wherein the passive mode is operated by:
controlling at least one of transparent image display element to not display any computer-generated objects; and
controlling at least one light valve element to allow light emanating from a real-life scenery.

13. The method of claim 11, wherein the virtual reality mode is operated by:
controlling at least one light valve element to block light emanating from a real-life scenery;
controlling at least one of the transparent image display element to display a computer-generated object; and
controlling at least one variable focus element to adjust its focal power such that the computer-generated object is in focusable distance for the user's eye.

14. The method of claim 11, wherein the mixed mode is operated by:
controlling at least one transparent image display element to show a computer-generated object and displaying a surrounding region as black;
controlling at least one light valve element to block light emanating from a real-life scenery;
controlling at least one variable focus element to adjust its focal power such that the computer-generated object is in focusable distance for a user's eye;
controlling at least one transparent image display element to show a negated artifact, of desired intensity, of the computer-generated object and placing the negated artifact in a position relative to the corresponding position of the computer-generated object;
controlling at least one light valve element to allow light emanating from the real-life scenery; and
controlling at least one variable focus element to adjust its focal power such that the real-life scenery is in focus for the user's eye.

15. The method of claim 14, further comprising:
controlling at least some transparent image display element(s), the light valve element(s) and the variable focus element(s) either independently, dependently, asynchronously, synchronously or in any combination.

16. The method of claim 14, further comprising:
receiving a user input for an opacity value that directly impacts the intensity of the negated artifact; and
receiving a user input for a duty cycle that directly impacts the percentage of the period that the at least one transparent image display element, the at least one light valve element, and the at least one variable focus element operates per cycle.

17. The method of claim 15, further comprising:
receiving a user input for an opacity value that directly impacts the intensity of the negated artifact; and
receiving a user input for a duty cycle that directly impacts the percentage of the period that the at least one transparent image display element, the at least one light valve element, and the at least one variable focus element operates per cycle.

* * * * *